US006931378B2

(12) United States Patent
Rao et al.

(10) Patent No.: US 6,931,378 B2
(45) Date of Patent: Aug. 16, 2005

(54) METHOD, SYSTEMS, AND PROGRAM PRODUCT FOR SELECTING AND ACQUIRING DATA TO UPDATE A GEOPHYSICAL DATABASE

(75) Inventors: M. Vikram Rao, Houston, TX (US); Jimmy R. Coe, Houston, TX (US); John W. Gibson, Katy, TX (US); Daniel D. Gleitman, Houston, TX (US); Sharon Rector, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 82 days.

(21) Appl. No.: 10/013,240

(22) Filed: Dec. 10, 2001

(65) Prior Publication Data

US 2003/0110087 A1 Jun. 12, 2003

(51) Int. Cl.[7] .............................................. G06F 17/60
(52) U.S. Cl. ...................................................... 705/26
(58) Field of Search ..................... 705/26, 27; 181/101, 181/108; 367/14, 15, 25, 36, 37; 702/14, 16

(56) References Cited

U.S. PATENT DOCUMENTS

| 4,876,673 A | * | 10/1989 | McCowan | 367/68 |
|---|---|---|---|---|
| 5,553,407 A | * | 9/1996 | Stump | 37/348 |
| 5,794,207 A | * | 8/1998 | Walker et al. | 705/26 |
| 6,028,819 A | * | 2/2000 | Mullarkey et al. | 367/37 |
| 6,519,568 B1 | * | 2/2003 | Harvey et al. | 705/1 |
| 6,560,565 B2 | * | 5/2003 | Roy et al. | 702/188 |
| 6,751,553 B2 | * | 6/2004 | Young et al. | 702/5 |
| 6,768,947 B2 | * | 7/2004 | Diller | 702/14 |
| 2002/0087348 A1 | * | 7/2002 | Decatur | 705/1 |
| 2002/0188405 A1 | * | 12/2002 | Luo et al. | 702/14 |
| 2002/0198817 A1 | * | 12/2002 | Dhir | 705/37 |
| 2003/0110087 A1 | * | 6/2003 | Rao et al. | 705/26 |
| 2003/0110183 A1 | * | 6/2003 | Gleitman et al. | 707/104.1 |
| 2003/0110184 A1 | * | 6/2003 | Gibson et al. | 707/104.1 |

FOREIGN PATENT DOCUMENTS

WO   WO 9815850 A1 * 4/1998 ............ G01V/1/42

OTHER PUBLICATIONS

Boleneous, David: "Guidelines for surface geochemical surveying"; Oil & Gas Journal, v92,n23,p59(5); Jun. 6, 1994.*

* cited by examiner

*Primary Examiner*—Jeffrey A. Smith
(74) *Attorney, Agent, or Firm*—Jeffrey L. Brandt

(57) ABSTRACT

Methods and systems for collecting, managing, distributing and updating geophysical data primarily for E&P companies include in one embodiment the sale of subscriptions entitling paid subscribers access to all subscribed data including both preview and full data. Initial and subsequent data providers are preferably compensated from subscriber fees and may be compensated based on relative subscriber use of data. Data subscriptions can include for subscribers the right to vote or otherwise provide input relating to desired data updates. Data updates are preferably purchased based on competitive bids.

The inventive systems and methods diminish much of the risk and uncertainty associated with the collection, management, distribution and updating of geophysical data under current methodologies, making the process more efficient and cost-effective for participating parties.

32 Claims, 9 Drawing Sheets

GEOPHYSICAL DATA DATABASE 32

| DATA SHOOT ID (34A) | DATA DESCRIPTION (34B) | DATA PROVIDER & TERMS (34C) | COLLECTION DATE (34D) | RELATED DATA LINK (34E) | DATA USAGE INFORMATION (34F) | DATA QUALITY INFORMATION (34G) | DATA (34H) |
|---|---|---|---|---|---|---|---|
| GC1 (33A) | GULF COAST MARINE AREA ABC: 1000 SQUARE MILES; 3D | ABC COLLECTOR: LICENSED UNDER XYZ TERMS & CONSIDITONS | 01/01/1998-03/01/1998 | LINK TO UPDATE SHOOT | (USAGE INFORMATION BY USER AND DATA UNIT) | QUALITY INFORMATION | (LINK TO DATA SET) |
| ME3 (33B) | MIDDLE EAST LAND AREA: 1500 SQUARE MILES; 4D | DEF OWNER: PURCHASED UNDER QRS TERMS & CONDITIONS | 01/01/1999-06/01/1999 | LINK TO COMPETITIVE SHOOT; LINK TO UPDATE SHOOT | (USAGE INFORMATION BY USER AND DATA UNIT) | QUALITY INFORMATION | (LINK TO DATA SET) |

Fig. 2

METHOD, SYSTEMS, AND PROGRAM PRODUCT FOR SELECTING AND ACQUIRING DATA TO UPDATE A GEOPHYSICAL DATABASE

CROSS REFERENCE TO RELATED CASES

This case is related to U.S. patent application Ser. No. 10/013,268 titled METHODS AND SYSTEMS FOR MANAGING AND DISTRIBUTING GEOPHYSICAL DATA by inventors John W. Gibson Jr. and M. Vikram Rao filed on Dec. 10, 2001 and to U.S. patent application Ser. No. 10/012,995 titled METHODS AND SYSTEMS FOR MANAGING AND UPDATING A DATABASE OF GEOPHYSICAL DATA by inventors Daniel D. Gleitman, Jimmy R. Coe, John W. Gibson Jr., M. Vikram Rao, and Sharon Rector filed on Dec. 10, 2001.

FIELD OF THE INVENTION

The present invention relates generally to data management and more particularly to the selection and acquisition of data for a geophysical seismic database.

BACKGROUND OF THE INVENTION

The collection and processing of geophysical data is critical to the development and management of the world's renewable hydrocarbon-based oil and gas fuels. Geophysical data, including seismic data, is collected for both land and marine geography. Once collected, it is processed using sophisticated digital signal processing techniques and made available for visualization by human experts. These experts analyze the data and make experience-based predictions as to the potential hydrocarbon reserves in the imaged geological structures.

The collection and processing of geophysical data is a massive and costly effort. Marine data collection, typically done by private boat operators in accordance with business relationships described below, is time consuming and expensive. A typical data collection effort for a specified geographic area, termed a "shoot," involves the generation of shockwaves, the echoes of which are collected by thousands of seismic sensors configured for 2- or 3-dimensional data collection and towed on lengthy streamers behind large, electronics-filled ships. Gigabytes of data are collected and stored for subsequent digital processing. For example, a 3-dimensional shoot in the Gulf of Mexico over a geographic area of 3 square miles could result in the collection of 240 gigabytes of data at a collection cost of $300,000.00. This cost does not include marketing and equipment deployment costs, which can add substantially to the data collection costs.

Land geophysical surveys are typically conducted over large geographical areas (tens to hundreds of square kilometers). Land surveys may take anywhere from a few days to a few years to complete, and require crews ranging from 20 to 1,000+ people. Land surveys require capital equipment valued in the tens of millions of dollars.

Seismic surveys are the first in a series of costly and time-consuming exploratory efforts undertaken prior to drilling for the production of gas and oil. If the results of a seismic survey appear promising, then exploratory drilling may be performed, typically through the use of expensive boat-based technology to explore deep-water resources. If exploratory drilling yields positive results, then the drilling of appraisal wells may follow.

If all of the preliminary activities yield positive results, a permanent drilling and production infrastructure may be built. Such an infrastructure is extraordinarily expensive to both construct and operate. For example, a deep-water drilling platform in the Gulf of Mexico could take 7–8 years and cost in the range of $1,000,000,000.00 to construct. The ongoing cost of operation is in the range of $25–35,000,000.00 per year for an estimated lifespan of 20 years.

It will thus be seen that the collection, review and analysis of seismic data comprises the first in an expensive and long-term series of exploration, drilling and production activities. Dated, corrupt or otherwise faulty or inadequate seismic data could initiate a chain of events that would waste significant amounts of money and result in the loss of valuable alternate opportunities. Exploration and Production ("E&P") companies collectively spend billions of dollars per year to support the acquisition and analysis of geophysical data, with the expectation that such data will help them build and replenish their inventories of prospects to drill, and minimize or avoid mistakes in selecting drilling sites. The availability of current, accurate geophysical data is of paramount importance to E&P companies.

Despite the value and importance of geophysical data, the existing market for collecting, updating and marketing such data is not an efficient one. Typically, geophysical data is collected in accordance with one of three different models.

In a first model, the geophysical data collector, or seismic company, collects marketing input including information from prospective E&P customers. It then makes its own decision as to what geographical area and parameters it is going to shoot. In a speculative shoot of this type, the seismic company borrows money or spends its own funds to cover the cost of the shoot. During or upon completion of the shoot, the seismic company attempts to market the data to one or more E&P companies. If the seismic company is successful, they may make a profit on the shoot. If the seismic company is unsuccessful, they may loose a great deal of money on the shoot. Regardless, under such a model the E&P company does not play a direct role in selecting the geographical area of the shoot. In fact, E&P companies may be reluctant to provide too much guidance because E&P company information may be considered trade secret. Thus, while speculative shoot data may be of value, it may not cover the most important area or include the most desirable shoot parameters for any single E&P customer. This type of data collection model is thus risky for the seismic company and not necessarily most efficient for a given E&P company.

In a second type of shoot, a proprietary shoot, a single E&P company engages a seismic company and funds the entire shoot. The E&P company thus gets to select the geographical location, type and extent of data collected and owns all of the data generated during the shoot. This model of geophysical data collection shifts much of the risk from the seismic company to the E&P company. It enables the E&P company to select the area and data type it believes to be most important to its current and future business positions. However, the cost to the E&P company is very high. If the data turns out to be of a lower value than expected, the E&P company will have suffered a significant financial loss. Further, the company will have wasted a significant portion of an allocated seismic budget, thereby reducing opportunities to consider and explore alternate opportunities. Ultimately, multiple failed opportunities could challenge an E&P company's ability to plan the development and profitable deployment of long-term drilling and production resources.

In a third type of shoot, the seismic company solicits multiple E&P companies to sponsor a shoot to develop data that will ultimately be shared by all of the sponsors. While superficially a multi-client shoot appears to be one of the most cost-effective types of shoots, it is not without its own significant challenges and risks. Assembling a multi-client shoot is difficult and expensive. A seismic company must solicit multiple E&P companies all wanting a shoot of the same geographical area and data type. Further, the seismic company must have, or be able to cost-effectively assemble, a data gathering boat and data collection facilities in the selected geographical area, which may be anywhere in the world. Matching the needs of multiple E&P clients with the capability of the seismic company can take a long period of time and significant expense. If the seismic company fails to assemble the multi-client shoot, he will suffer a business loss. Further, it is likely that one or more of the E&P clients may make some concession in geographical or data-type preference to enjoy the financial advantage of joining a multi-client shoot.

Regardless of the type of shoot, speculative, proprietary or multi-client, there are many variables that can have a significant affect on both the profitability of the shoot to the seismic company and the value of the data to the E&P company. Logistical costs, administrative costs, broker costs, the cost of accidental or convenience-driven overshoots, can all affect the cost and profitability of a shoot.

It will thus be understood that seismic data collection today, particularly boat operation, can be a risky and inefficient business. The lack of predictable demand results in the taking of speculative shoots and the ad hoc marketing of these shoots. Because it is difficult for boat owners to predict future demand, they cannot easily determine where to efficiently locate boats.

From a consideration of the above, it will be understood that despite the importance of geophysical data to the development of world energy needs, the processes for collecting such data are not very efficient. As will now be explained, the current models for managing and distributing collected geophysical data are not in and of themselves efficient, either.

The totality of all geophysical data collected to date has been estimated to be in the multi-petabyte range in size. This collected data resides in a vast assortment of locations, including but not limited to: seismic acquisition companies, E&P companies, intermediary storage facilities and data warehouses. In fact, because of the processing issues associated with collecting and distributing data, collected data is likely to be copied to multiple locations, including the original collector, the end-user and often a facilitating intermediary.

There is often a desire on the part of a data owner to recoup its investment in collecting or buying the data by subsequently reselling it to other users. There is often a concomitant desire by E&P companies to recognize the cost efficiencies that can be realized by licensing access to or purchasing existing data. However, licensing or reselling data is often difficult for a variety of legal and logistical reasons.

As described above, data often resides in multiple locations. The exact location and ownership of the data may be uncertain. As a result of transmission, storage and processing, the quality of the data may be questionable. Data sets may be so large that it becomes inefficient if not impossible to sort them, identify their contents and distribute them to potential new users.

Access to geophysical data is typically sold on a 'per shoot' basis. That is, an E&P company must buy individual access to every shoot of interest. Further, geophysical data is often sold according to a tiered price structure. Because of the high costs of even 'used' data, a typical licensing structure may include providing access to 'peek' data at a first, less expensive cost, followed by access to full data at a second, higher cost. This tiered cost structure enables inexpensive preview of data with a higher fee paid only for data of interest. However, because of the size of the data sets, this type of tiered data distribution creates technical challenges in addition to all of the issues described above.

To address some of the issues described above, data brokers exist for buying and distributing seismic data. Such companies, including for example Seitel aud Veritas, acquire and broker data from various sources for resale or licensing to others. E&P companies such as EXXON, Chevron, Shell and others may license or resell their own proprietary data. In addition to brokering seismic data, indigopool.com is a company that brokers oilfield properties including the provision of supporting data (e.g. seismic surveys) available for review by interested buyers.

However, the mere collection and brokering of seismic data does not address, much less solve, many of the problems outlined above.

It is thus seen that there exists huge quantities of costly, collected geophysical data having potentially significant value to various users above and beyond those who sponsored the initial collections. However, significant problems exist with organizing, identifying, maintaining the integrity of and distributing such data to potential users. As described above there are significant challenges associated with efficiently selecting, collecting and distributing new data.

The various interested parties often find today's methodologies inefficient and costly. Boat owners are faced with unorganized, unpredictable demand that makes efficient boat placement and operation challenging if not impossible. E&P companies face huge expenditures to get access to limited data which may be of unexpectedly low value. Brokering of data attempts to address some of the challenges faced in the industry through more widespread distribution of existing data. However, brokering of seismic data does not address the core inefficiencies in collection and distribution described above.

SUMMARY OF THE INVENTION

An object of the invention is to provide new and improved methods and systems for efficiently managing the maintenance and updating of geophysical data.

In one embodiment of the invention there are provided methods and systems for operating a geophysical database containing data relating to underground structures, a method comprising the steps of: storing said data in the geophysical database, the data including multiple shoots; identifying a new shoot to add to the geophysical database; identifying a plurality of potential data providers to provide the new shoot; providing to the plurality of potential data providers information about the new shoot; collecting a bid from each of the plurality of potential data providers to provide the new shoot; selecting, using the bids, a selected provider for the new shoot; and acquiring the new shoot from the selected provider.

In another embodiment of the invention there are provided systems and methods for operating a geophysical database containing data relating to underground structures, a method comprising the steps of: storing the data in the geophysical database, the data including multiple shoots; establishing a plurality of accounts, each respective account for a user including access to subscriber data in the geophysical database and a right to provide input on updates to the geophysical database; collecting from the users input relating to updating the geophysical database; identifying, based in at least part on the collecting step, a new shoot to add to the geophysical database; identifying a plurality of potential data providers to provide the new shoot; providing to the plurality of potential data providers information about the new shoot; soliciting, from each of the plurality of potential data providers, a bid for the new shoot; collecting the bid from each of the plurality of potential data providers to provide the new shoot; selecting, using the bids, a selected provider for the new shoot; and acquiring the new shoot from the selected provider.

In accordance with another embodiment of the invention there are provided systems and methods for operating a geophysical database containing data relating to underground structures, a method comprising the steps of: storing the data in the geophysical database; identifying a plurality of users each desiring access to the geophysical database; collecting a respective fee from each of the plurality of users to establish for each of the plurality of users a respective subscription to the geophysical database; providing to each of the plurality of users access to data for use in assessing the hydrocarbon potential of the underground structures; providing with each respective subscription a right to provide input on updates to the data; collecting from each of the plurality of users a respective request to update the data; selecting, based on the step of collecting from each of the plurality of users a respective request to update the data, candidate data updates; collecting competitive bids for the candidate data updates from a plurality of potential data providers; selecting, based on the respective requests from the plurality of users and the competitive bids from the plurality of potential data providers, at least one selected data update from a selected data provider; and acquiring, funded at least in part by the fees collected from the plurality of subscribers, the desired data updates from the potential data providers.

In yet another embodiment of the invention there are provided systems and methods for compensating data owners for providing geophysical data to a geophysical database, a method comprising the steps of: receiving geophysical data from a data owner; storing the geophysical data in a geophysical database; establishing a plurality of subscriptions to the geophysical database, each of the plurality of subscriptions including a respective fee for which a respective subscriber is provided access to the geophysical data; and compensating the data owner based at least in part on the total value of the fees collected from the subscribers.

In another embodiment of the invention there are provided systems and methods for compensating data owners for providing geophysical data to a geophysical database, a method comprising the steps of: receiving a first geophysical data shoot from a first data provider; receiving a second geophysical data shoot from a second data provider; storing the first and second geophysical data shoots in a geophysical database; establishing a plurality of subscriptions to the geophysical database, each of the plurality of subscriptions including access to the first and second geophysical data shoots; and compensating the first data provider based at least in part on the relative use of the first geophysical data shoot under the plurality of subscriptions.

In another embodiment of the invention there are provided systems and methods for compensating data owners for providing geophysical data to a geophysical database, a method comprising the steps of: collecting a first geophysical data set from a first data provider, the first geophysical data set for a geographical area; collecting a second geophysical data set from a second data provider, the second geophysical data set for the geographical area; storing the first and second geophysical data sets in a geophysical database; establishing a plurality of subscriptions to the geophysical database, each of the subscriptions including subscriber access to the geophysical database for a respective fee; identifying at least a portion of the fees collected for the plurality of subscriptions for compensating the first and second data providers; measuring the usage of the first and second geophysical data sets for the geographical area by subscribers; and compensating the first and second data owners based at least in part on the relative use of the first and second geophysical data sets for the geographical area.

It will be seen that one significant advantage of the invention is that of providing E&P companies access to plentiful and geographically diverse seismic data in a cost-effective manner.

BRIEF DESCRIPTION OF THE DRAWING FIGURES

These and other objects, features and advantages will become apparent from a consideration of the detailed description of the invention when read in conjunction with the drawing figures, in which:

FIG. 2 is a table showing an implementation of the geophysical database of FIG. 1;

DETAILED DESCRIPTION OF THE INVENTION

Figure 1:
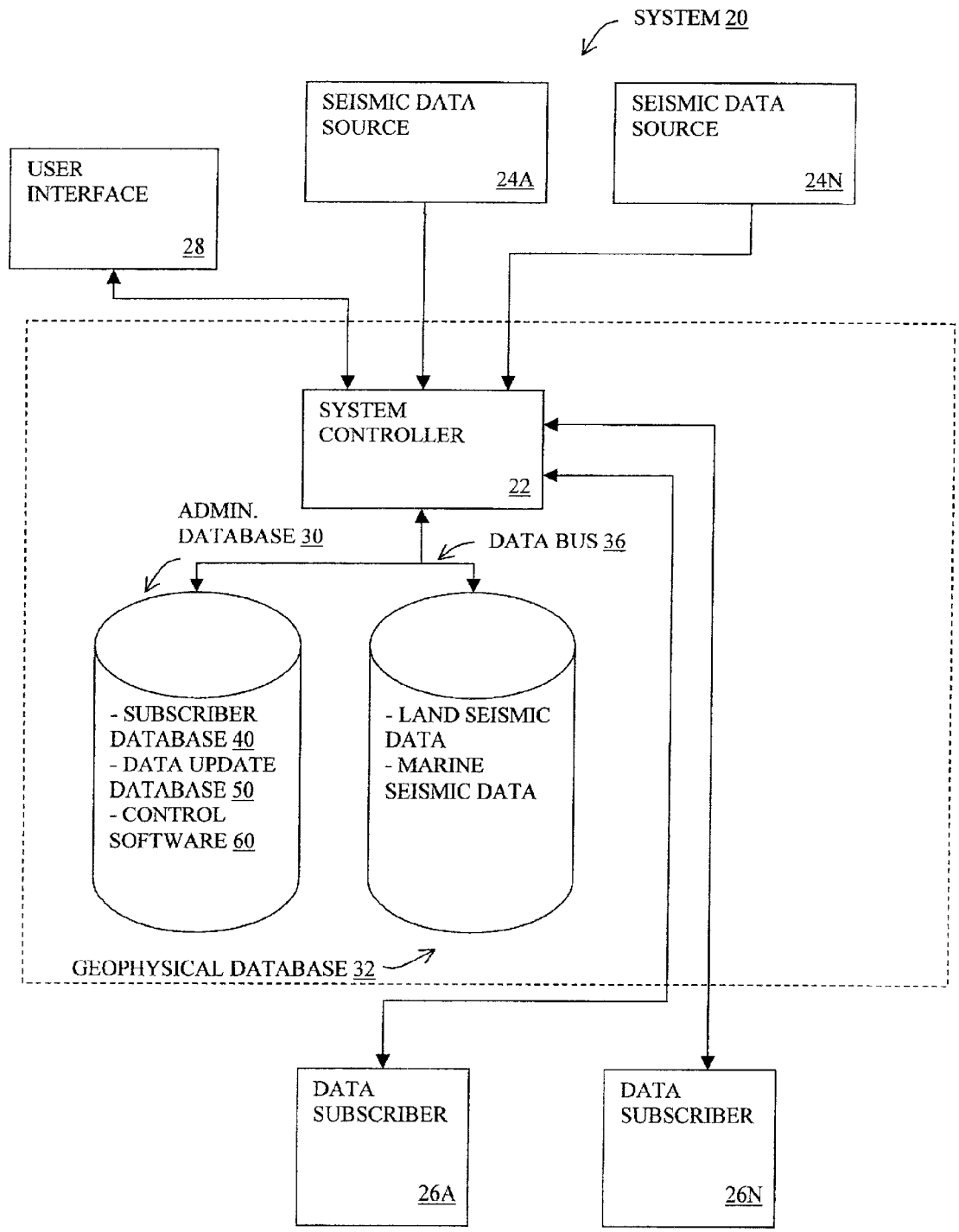
FIG. 1 is a block diagram of a geophysical data collection, processing and distribution system in accordance with the present invention.

With reference now to FIG. 1, there is shown a system 20 for geophysical data collection, processing and distribution in accordance with one embodiment of the present invention. System 20 is seen to include a system controller 22 connected through an appropriate interface to various sources of seismic data 24A–24N. System controller 22 is further connected to a user interface 28, such as a graphical display device and keyboard, for receiving input from a user (e.g. a system administrator) including software and control instructions, and to a plurality of data subscribers 26A–26N for sharing various data including seismic data.

System 20 further includes an administrative database 30 and a geophysical database 32, each connected to system controller 22 through a data bus 36.

System controller 22 can comprise one or more appropriately sized computers, for example a Sun™ workstation(s) running a Solaris™ operating system. Multiple computers may be located geographically proximate or remote from one-another and may comprise the same or different computer types. Many alternate computer systems operational to perform the functions described herein are known to those skilled in the art, ranging in size and capability from desktop computer systems to mainframe computers systems, the type and capability selected in a well-known manner based on performance requirements. One other exemplary type of system controller includes for example IBM-compatible computer systems running the Microsoft Windows™ operating system.

Administrative database 30 and geophysical database 32 each comprise an appropriate combination of storage elements, including for example magnetic, optical and semiconductor storage. Commonly known configurations for storing and retrieving large quantities of seismic data as described herein include magnetic tape drive systems, some types of which use human or robotic operators to load, unload and otherwise manipulate reels of magnetic tape. Databases 30 and 32 may comprise one single or many multiple, geographically diverse databases, providing local storage, remote storage and/or distributed storage amongst various storage facilities in various geographical locations. The appropriate selection of database resources is made in accordance with system requirements in a well-known manner. Data bus 36 comprises one or more appropriate internal or external high-speed data buses, many of which are known in the art.

As can be seen in FIG. 1, administrative database 30 includes a user subscription database 40, a data update database 50 and control software 60 for operating system 20 in accordance with the present invention, all of which are described in further detail below. It will be understood that the present invention contemplates appropriate human interactions through user interface 28 and in various other respects where human intervention, direction, control or the like is appropriate to the operation of system 20.

Geophysical database 32, as described in further detail below, can contain many different types of data including both land and marine seismic data of varying parameters. It will be understood that seismic data may be processed in many different manners for many different uses. Human viewing and analysis, for example, requires the processing of seismic data to yield human-interpretable graphical displays. It will be understood that such processing may be performed by system controller 22, by data collectors or data owners or users, or by other known sources including out-source service providers engaged in the commercial business of processing seismic data for various customers.

Many different origins are known for seismic data sources 24A–24N. For example, simple input devices can be used to load data from tapes or other storage devices onto the system. High-speed network connections can be used to link remote data sources directly into system controller 22. As will be further discussed below, the providers of seismic data feeding seismic data sources 24A–24N can include seismic data owners such as Seitel and Veritas, as well as E&P companies owning proprietary shoots.

Continuing with reference to FIG. 1, data subscribers constitute the users of the geophysical data stored in geophysical database 32, typically an E&P company such as Exxon, Chevron, or Shell, utilizing such data for purposes of evaluating underground, potentially-hydrocarbon-bearing structures, prior to investing in expensive exploration and or production facilities. Actual data subscriber interfaces as indicated at 26A-26N can comprise any suitable user interface from a simple display terminal to a desktop computer, workstation, or mainframe computer with an appropriate user interface. As is known in the art, geophysical data is typically processed for human viewing and visual analysis, but may also be processed for computer-controlled analysis.

System 20 can be operated by one of many different parties in the business of collecting, processing and distributing geophysical data. Such companies can include, for example, a geophysical data owner or collector, an E&P company or consortium of E&P companies, or other value-add service providers in the energy industry such as Halliburton Company.

With reference now to FIG. 2 there is shown geophysical database 32 including, for purposes of illustration, two data records 33A, 33B, each having eight data fields 34A–34H. Data field 34A stores a data shoot identifier by which a particular data shoot can be identified. Data field 34B stores information about the data including a geographical location of the data shoot and description of the data contained in the particular linked data set, including for example shoot parameters such as type of data, size of the area, number of lines, identities of particular data sectors contained within the shoot, etc. Data field 34C stores the identity of the provider of the particular data described in the particular record as well as the payment terms relevant to that data provider. Data field 34D stores the date or date range that the data shoot was collected and may optionally include the date on which the data was entered into geophysical database 32, while data field 34E stores any link(s) to related data. Links to related data can include hyperlinks, shoot identifiers or other data enabling a user to locate such related data. The related data itself includes competitive data covering the same geophysical area or sector, updated shoots of the same data and other related data sets that may for any appropriate reason be of interest to a user of the original data.

As used herein, the terms 'shoot,' 'sector' and 'line,' or variants thereof, are used in their conventional sense. Thus, a 'shoot' refers to data collected under a contract referring to a particular geographic area. A 'sector' refers to a small, identifiable subset of a larger data set or shoot. A 'line' refers to both data collected by a particular line of sensors towed or laid over a specific path and arbitrary lines of data synthetically extracted from a data set using appropriate data processing techniques. Collected lines and arbitrary lines are indistinguishable to the end-user.

As an illustrative example, a particular shoot may comprise data collected under a contract for the collection of geophysical data over a 100 square mile area in the Gulf of Mexico. That shoot may be identified as including many different sectors, for example 100×1 square mile sectors or 10×10 square mile sectors. Each sector comprises multiple segments of collected or arbitrary data lines.

As contemplated by the present invention, geophysical data available to subscribers preferably includes data from multiple shoots. Thus, as further described herein, in comparison to the prior art where a single license typically gains a subscriber access to data from a single shoot, a single subscription in accordance with the present invention enables access to a large collection of shoots of diverse data types and locations. Different shoots may, for example, be purchased from and/or licensed from different collectors and/or owners. They may be collected with different technologies, may consist of different data types and/or may have been taken at different times. Different shoots may be adjoining, overlapping or completely separate in geographical area. Overlapping shoots may include different data types, different shoot parameters and/or have been collected at different times.

Continuing with reference to FIG. 2, data field 34F stores subscriber usage information. The purpose of this information is to track subscriber usage of seismic data. Usage is preferably tracked both for individual subscribers and for aggregate usage across multiple subscribers. Usage is further preferably tracked for both larger sets of data, i.e. regional shoots, as well as for sub-units of data down to individual seismic lines. It is desirable to store sufficient data so that subscriber usage can be tracked for any selected single subscriber or group of subscribers to any unit or sub-unit of data. Such data usage information is relevant, for example, in deciding on data updates and determining data provider payments in the manner described below. In a similar manner, data field 34G stores quality information for each shoot, again desirably for sub-units of the shoot data. Data quality may be based on user feedback or other analysis such as expert analysis.

The last displayed field of geophysical database 32 is data field 34H containing the actual geophysical data or more typically a link to same. Actual geophysical data is typically stored in special data storage devices designed to store large data sets, many types of which are well known in the art as described above.

As discussed above, raw seismic data must be processed in order to be interpreted in a useful manner. Some data processing may be performed by the data collector. Data processing may also be performed by the data owner and/or data user. Seismic data processing can also be purchased from commercial service providers. It will be understood that for purposes of the present invention, seismic data residing in data field 36H may include different levels of processing for different data sets. Additional data processing may be available through system 20 and/or may be procured from outside sources.

Figure 3:
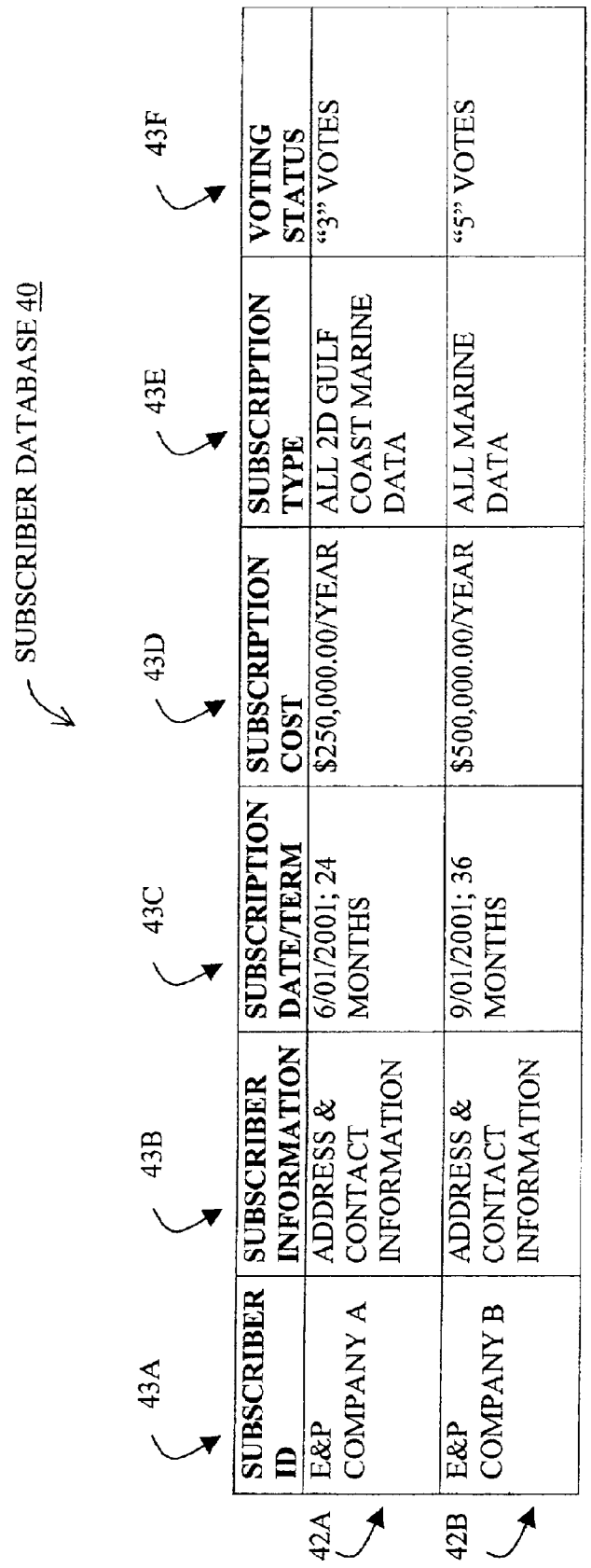
FIG. 3 is a table showing an implementation of the subscriber database of FIG. 1.

With reference now to FIG. 3 there is shown subscriber database 40 including two data records 42A, 42B, each record containing six data fields 43A–43F. Data field 43A stores a subscriber identifier, for example a name or number or other unique identifier for each subscriber. As noted above, a typical subscriber is an E&P company, but other users of geophysical data may of course subscribe. Data field 43B contains subscriber information such as address and contact information. Data field 43C stores the date on which the subscription was initiated and a subscription term, while data field 43D stores the subscription fee for the identified subscriber. Data field 43E stores the type of subscription purchased by the subscriber, particularly details regarding data access, while data field 43F stores voting status including information relating to the rights of the subscriber in selecting new or updated data shoots. As is described in additional detail below, different subscription types can include access to different data, different geographies, different shoot types (i.e. 2D, 3D or 4D), different numbers of users, etc. Different subscriptions can also include different rights with respect to voting or otherwise providing input on geophysical data additions and updates. In addition to the right to provide input on data updates, subscription rights may also include additional rights as to new data access and usage, for example exclusive rights to certain data additions or updates for a limited term. Subscriptions may also be for different periods of time. Predetermined time periods may run for any length from short periods of time to in perpetuity.

Figure 4:
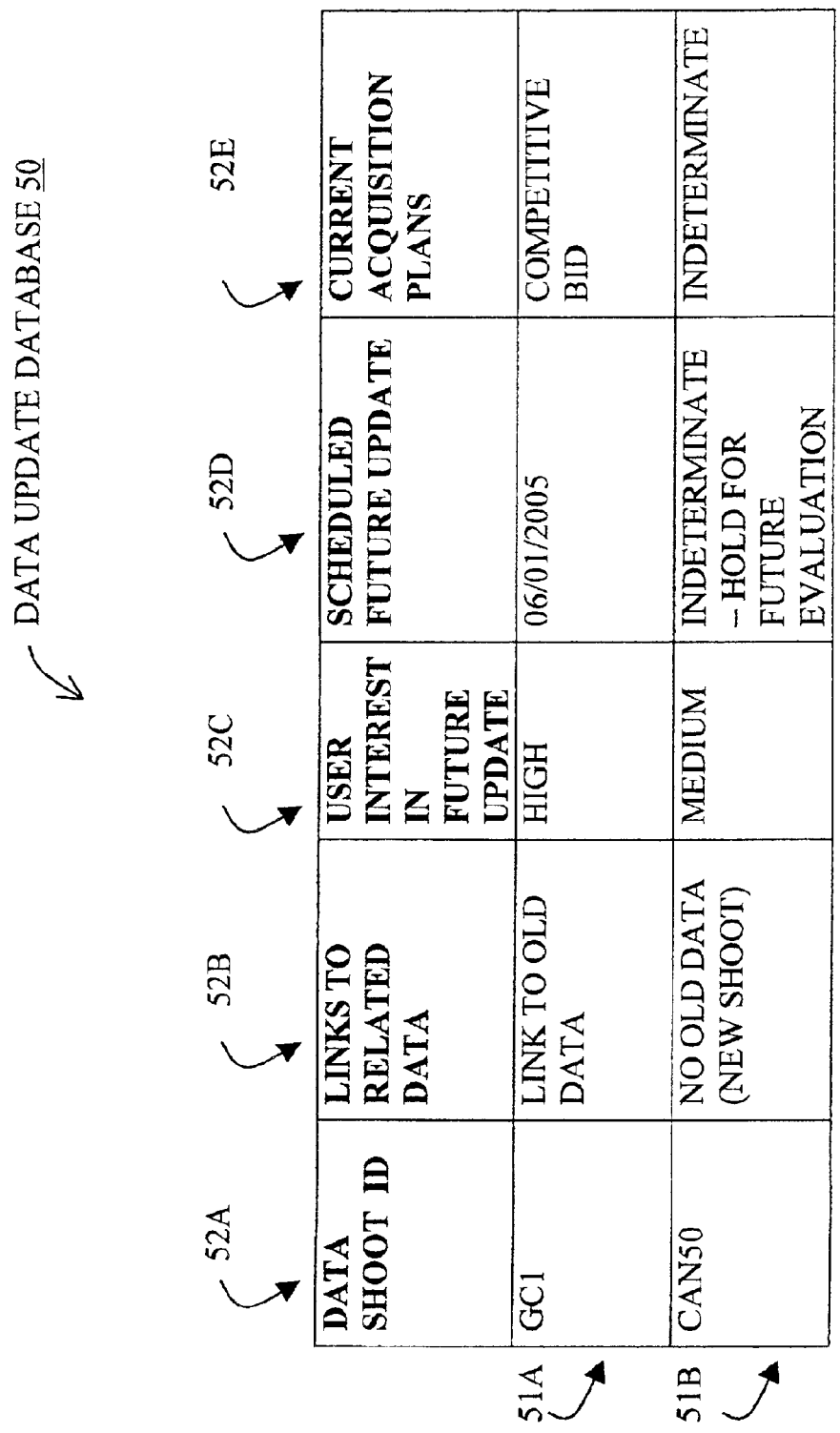
FIG. 4 is a table showing an implementation of the data update database of FIG. 1.

With reference now to FIG. 4, there is shown update database 50 including two records 51A, 51B, each containing five fields 52A–52E. Field 52A stores the anticipated data shoot identifier, while field 52B stores links to any related shoots, for example existing data shoots. Data field 52C indicates the level of subscriber interest in completing the anticipated shoot, different methods for obtaining such levels of interest being described herein below. Data field 52D stores the anticipated date the future update data is scheduled to be available to users, while field 52E stores the currently anticipated method of acquiring such data. Again, different methods of data acquisition are described in detail below.

Figure 5:
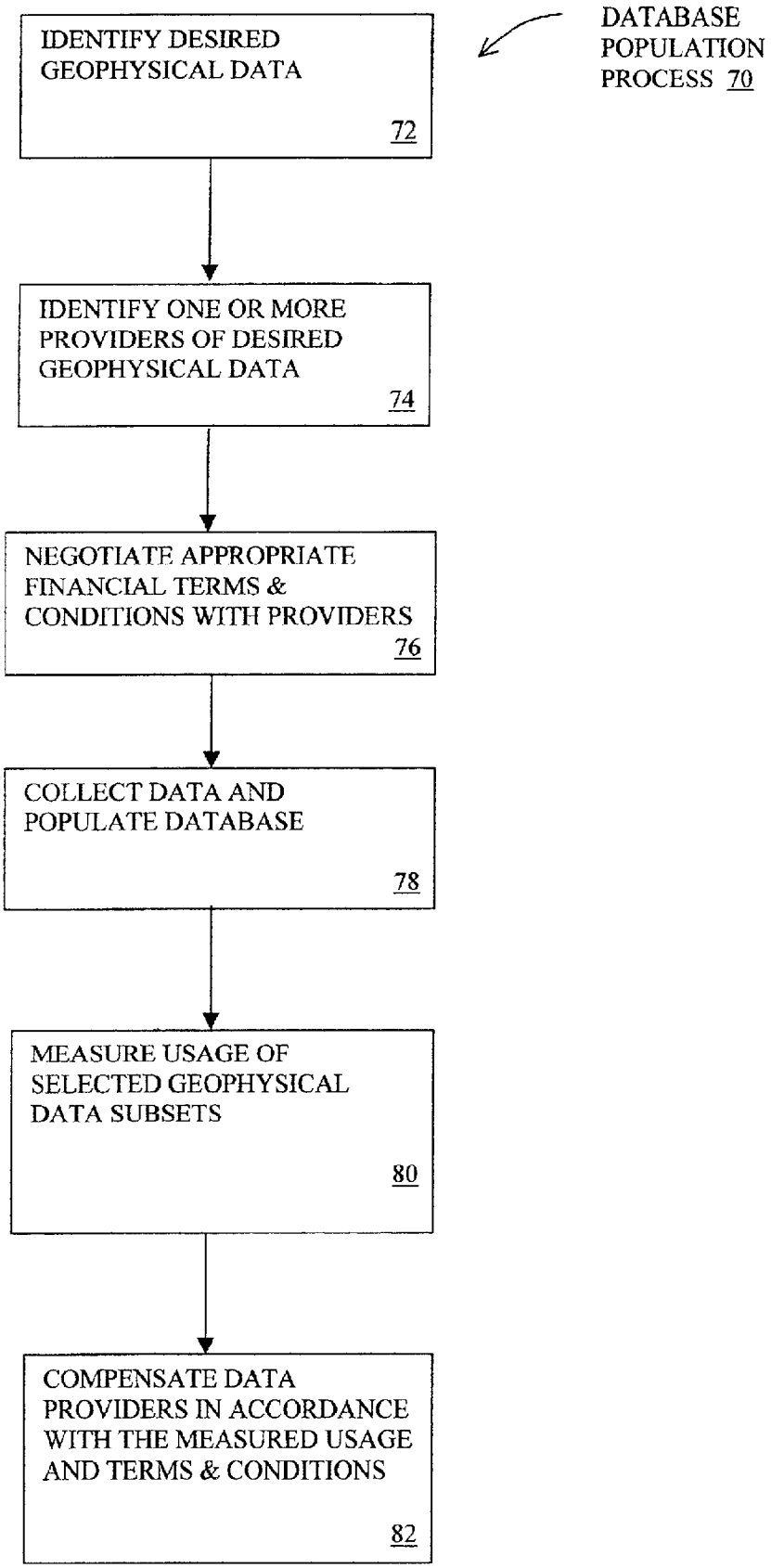
FIG. 5 is a flowchart showing a method of collecting data from data providers to initially populate the geophysical database and compensate the data providers in accordance with the present invention.

With reference now to FIG. 5, there is provided a method 70 for collecting geophysical data to initially populate geophysical database 32. In accordance with one embodiment of the invention, desired geophysical data and its providers are identified (steps 72, 74). It will be understood that data providers can include both data collectors and data owners, that is anyone in physical possession of data or capable of collecting or obtaining data for use by the system in accordance with appropriate terms and conditions as described below.

Subsequent to the identification of the data, terms and conditions for its use in system 20 are negotiated with the current owner (step 76) or potential provider. Data may be purchased or licensed, and is collected for inclusion in geophysical database 32 (step 78).

Financial valuation of acquired datasets may be based on usage and/or quality of the entire dataset or on subsets within the dataset, for example a shoot(s) or line(s). Data valuation may be absolute, that is at a fixed purchase cost or licensing fee, or relative to data usage. Data usage may be measured relative to similar competitive data or relative to the use of all data. Data quality, as determined by subscribers and/or experts, may be used as a factor in determining data valuation. Further, compensation to the data provider may be calculated as an absolute function of use or a relative function of use. For example, an absolute payment may be calculated as $X per user access to a shoot or line. A relative payment may comprise, for example, Y % of a total pool of compensation dollars, Y being determined by the relative use of the data in comparison to similar competitive data or all data.

In one particular embodiment of the invention, the value of the data is determined for individual subsets of data. Subsets may comprise, for example, individual sectors or lines. In this embodiment of the invention, the value of the data is determined relative to its use by customers (step 80) and the data owner is ultimately compensated relative to total dollars available for payment to data providers of competitive data (step 82).

To illustrate various payment alternatives, it will be assumed that three data providers each contribute data relating to a particular geographical region in the Gulf of Mexico. The three data providers' contributions in aggregate provide significant coverage of the particular geographical region. Further, the contributions have some overlap with each other in both geography and functional data type.

Continuing with this example, it will be assumed that it was agreed upon the provision of the data for the particular geographic region by the three data providers, that $X million dollars would be set aside for the subsequent payment of licensing fees for that data. Alternatively, it could have been agreed that Z % of subscriber fees, collected from subscribers having access to the particular geographic area, would be set aside to pay the licensing fees.

Subsequently, actual usage of the particular geographical data by subscribers is monitored. After a predetermined period of time, or optionally on an ongoing basis, payment is made to the data providers in accordance with the measured, relative use of the three data sets. If a fixed, set-aside dollar amount is used, that amount is divided amongst the three data providers in accordance with the relative percentage of data use. If a percentage of revenue stream payment is specified, that percentage of the incoming revenue stream is divided amongst the three data providers in accordance with the relative percentage of data use. Relative data use can comprise relative number of accesses of each data set by all subscribers to system 20 during the relevant time period.

While the payment methodologies described above have been described with respect to the initial population of the database, it will be understood that they are equally applicable to compensating for updates and additions to the database.

In accordance with another feature of the invention, subscription fees are set sufficiently high to accommodate the cost of updating data within the system and/or acquiring both the initial and new and updated data for inclusion in the system. Processes for determining geophysical data updates and additions are described below.

Figure 6:
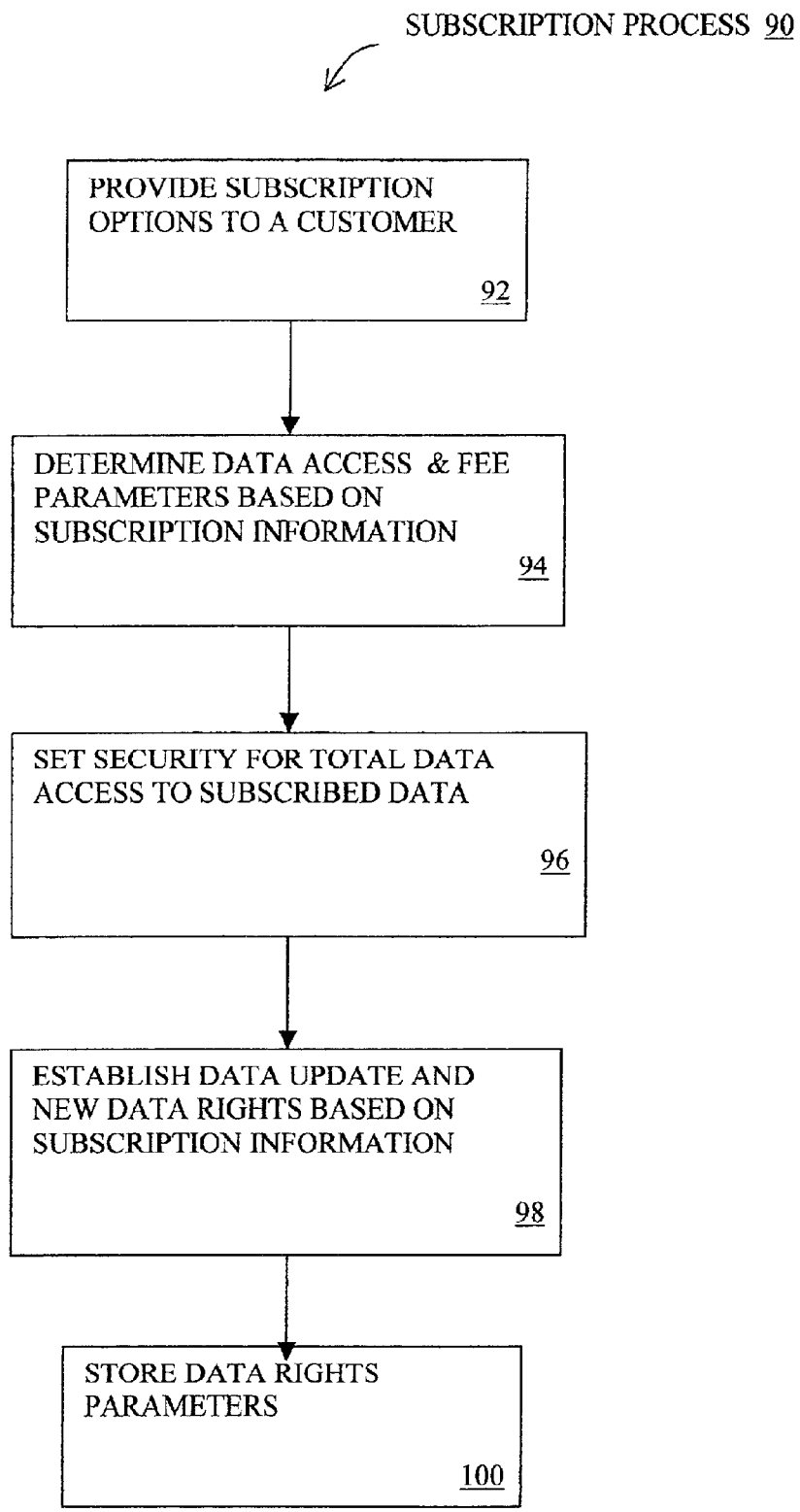
FIG. 6 is a flowchart showing a method of initiating subscriptions in accordance with the present invention.

With reference now to FIG. 6, a customer subscription process 90 is shown wherein multiple subscription options are provided to a customer (step 92), the options involving primarily access to data and rights with respect to upgrading or adding new data.

In one embodiment of the invention, and contrary to traditional subscription practices, subscribers are provided total access to all subscribed data including preview data and full data. The user may pick desired data access parameters, for which a fee is determined (step 94). Data access parameters may include, for example, geographic area, data type, number of 'seats' or users, and number of seats per geographic area. For that single fee, the user is granted access to the entirety of all data within the area and data types, with system security and access codes being set accordingly (step 96).

As described herein, in the prior art a subscriber must typically purchase multiple licenses to access multiple shoots. Further, a subscriber typically pays tiered fees within each license to access different levels of data; that is a first fee to access preview data and an additional fee to access full data. In contrast to the prior art, in one embodiment of the present invention a subscriber can purchase a single subscription to gain access to all data in multiple shoots. Access to all data in multiple shoots may be provided for a single fee. It will be understood that single fee pricing structures, which provide access to all data in multiple shoots, can take many forms, one of which is unlimited access to all data in a database for a set price. Alternate pricing structures yielding access to all data in multiple shoots set caps based on access time or quantity of data accessed.

Alternate pricing structures can provide access to all subscribed data, whether that data is within a single shoot or multiple shoots, or to limited data within multiple shoots. Still other pricing structures can include different prices for access to different types of data, data from different geographies and/or data collected at different times. While many different pricing structures will now become apparent, in preferred embodiments of the invention a subscriber is, for a single subscription under a predetermined fee structure, given access to a greater diversity of data than is typically available under a prior art license to a single shoot. It will be appreciated that the aggregation of data from multiple shoots results in reduced transactional costs to the system operator. The absolute dollar cost of a subscription to more diverse data in accordance with the invention may be higher than the cost of a license to a single shoot, while still providing more value to the subscriber.

In accordance with a feature of the present invention, subscribers 26A–26N play a significant role in determining what data will be updated within the system and what new data will be added to the system. In addition to establishing data access, during the subscription process customer rights are determined relative to updating and/or adding new data to the database (step 98).

As used herein, references to data updates include both the gathering of new data to supplement existing data covering similar geographical areas as well as the collection of new data to add new geographical areas and/or data types not currently available in geophysical database 32. Data in a particular geographical area may be updated, for example, because of changing subsurface physical conditions including the movement of formation fluids, to use and obtain the advantage of different or new and improved technology data gathering techniques, to replace data of low or deteriorating quality and for a variety of other reasons that will be apparent to those knowledgeable in the art.

Subscriber rights regarding new and updated data may comprise, for example, voting rights, with voting weight determined by the subscription fee and/or other parameters of the subscription. Alternatively such rights may include the right to participate on and/or lead a committee for developing update or new data requests.

Subsequently, the subscriber rights with respect to updating and/or adding new data are stored (step 100) in subscriber database 40.

Figure 7:
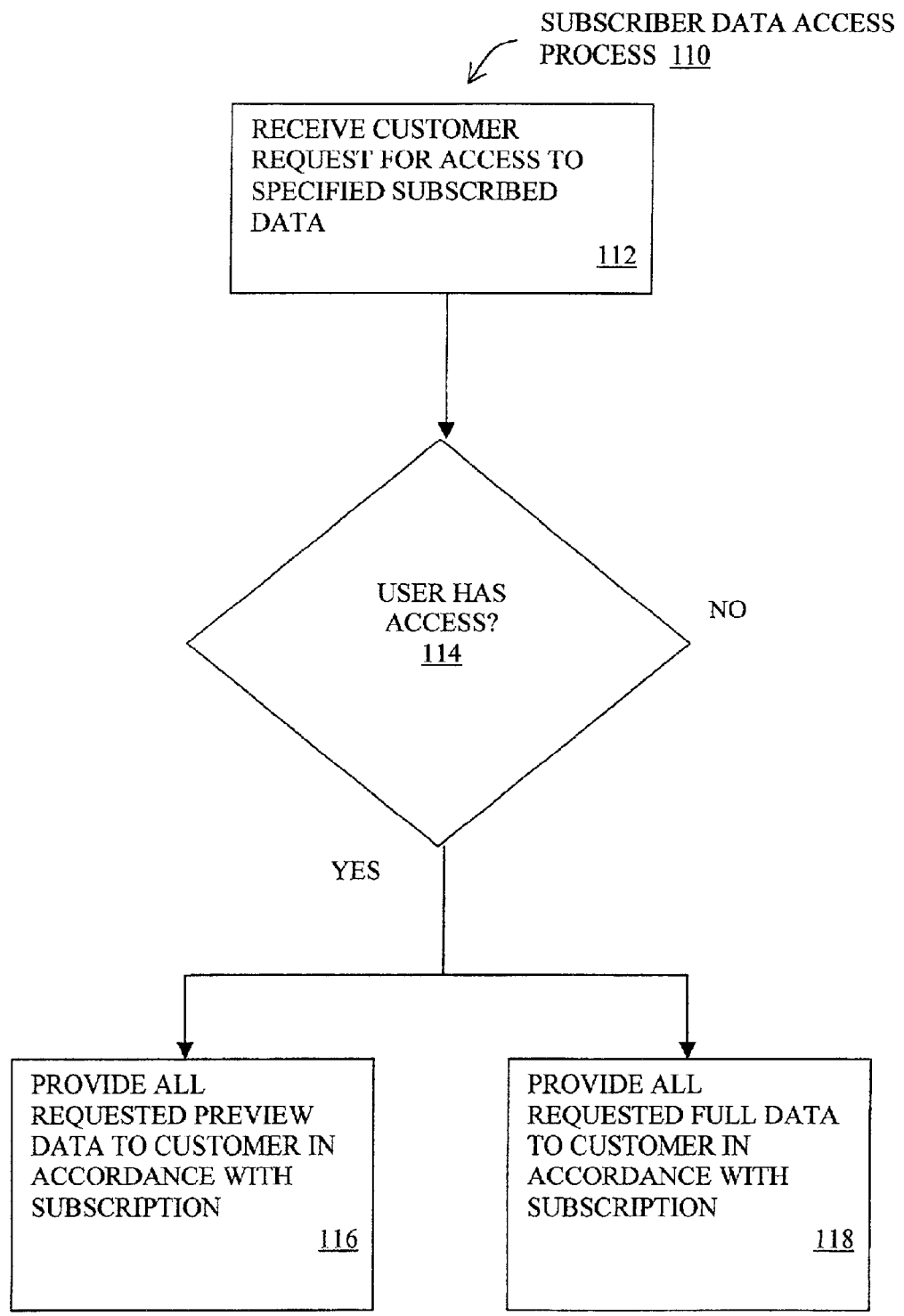
FIG. 7 is a flow chart showing a method of providing data to customers in accordance with the present invention.

With reference now to FIG. 7, a process 110 is shown for providing subscribers access to data, wherein a subscriber requests access to particular geophysical data (step 112). In accordance with the invention, it is determined if the subscriber has purchased access to that data (step 114). This can be determined, for example, by checking subscriber database 40 to determine if the subscriber purchased access to the requested data during the subscription process described above. Alternatively, subscribers may be provided security codes enabling access to geophysical data commensurate with the data access purchased in the course of the subscription process described above. If a subscriber purchases multiple seats, then multiple access authorities and limitations may likewise be granted.

In accordance with one embodiment of the invention, the customer is granted full access to all subscribed data, including all preview data (step 116) and full data (step 118). Granting of access to all subscribed data for a single subscription fee is in contrast to prior art data distribution processes wherein data owners charge data users for access to individual shoots, sometimes charging data users a first fee for preview data and a second fee for full data. In comparison, the new and improved methods and systems described herein for establishing subscriptions and setting fees for access to all data will be seen to make the entire process of collecting, distributing, maintaining and updating geophysical data simpler and more cost-effective than those of the prior art. More specifically, subscribers to the current system will receive cost-effective access to multiple shoots including shoots of different locations and data types and, in some instances, overlapping shoots of same or different data type. Subscribers can thus cost-effectively obtain access to substantially more data, increasing the population of potential prospects to assess and consider for drilling and thereby "high-grade" the set of prospects ultimately chosen to be drilled, while lowering both their expenses and their risks.

Further, unlimited access to data enables an E&P subscriber to efficiently "browse" multiple data sets, possibly from multiple geographic regions, seeking 'analogs' to areas under assessment. That is, a subscriber can browse, seeking seismic or geophysical data in known oil/gas producing areas analogous to a prospective area under assessment. Such found analog structures and associated known production data can be used to improve predictions on a prospective area's production performance. Further, this analytical capability enables subscribers to search and data-mine for geophysical signatures that an E&P company believes to be analogous to its known high performance oil/gas fields, thus revealing new potential prospects. These more optimal uses of a large, unrestricted body of geophysical data are not practical in the prior art where an E&P company would need to purchase very expensive access to large numbers of datasets.

Figure 8:
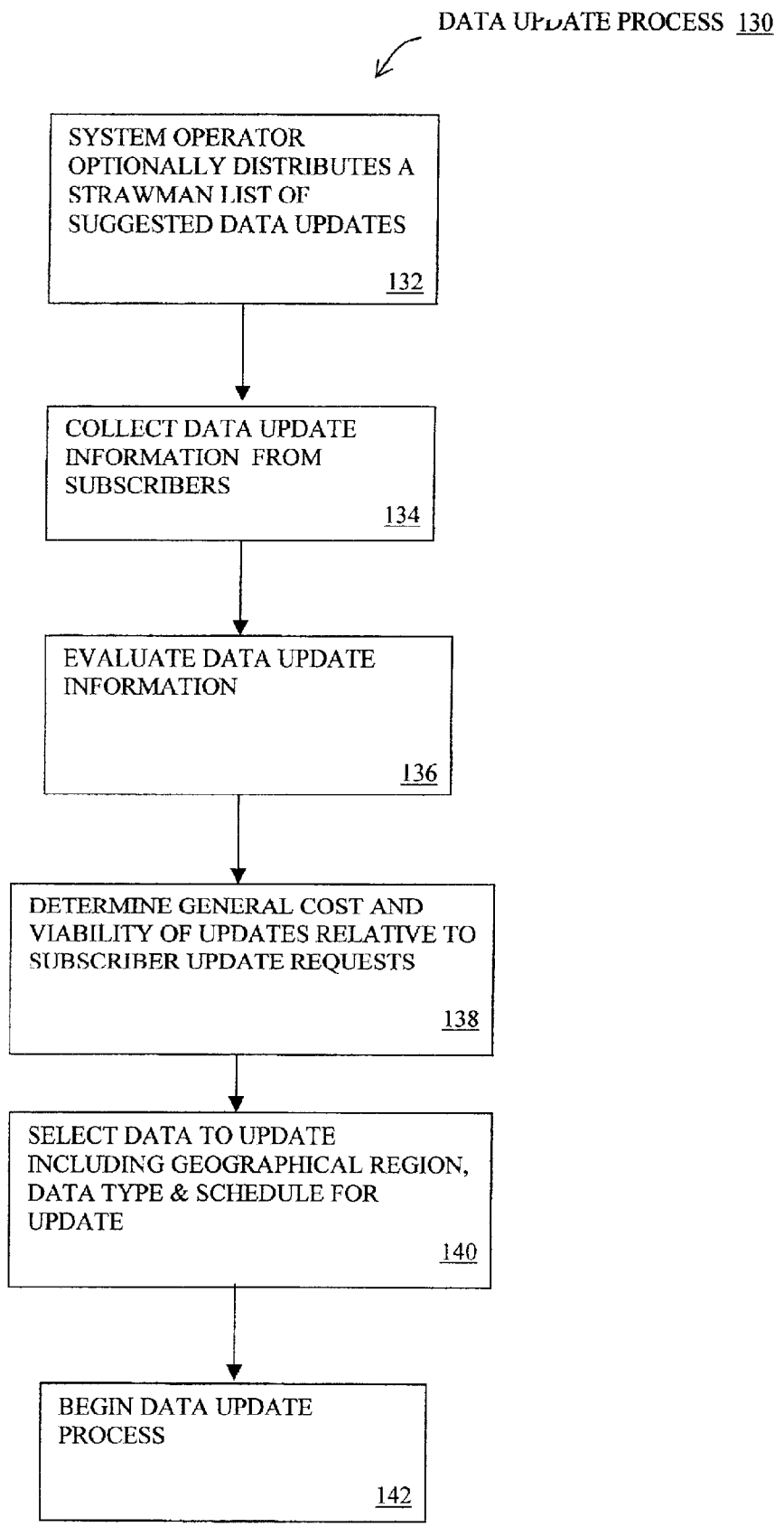
FIG. 8 is a flow chart showing a method of identifying data updates and/or new data acquisition in accordance with the present invention.

With reference now to FIG. 8, there is shown a data update process 130 that begins optionally with the distribution of a straw-man, or suggested list of data updates (step 132).

Suggested updates may be proposed by the manager of system 20 and may be based on a variety of factors, including, for example, anticipated future needs for new geographic areas, the value of re-shoots using new technology, the usage of existing data, the quality of existing data, known availability of update data, cost and availability of data collection facilities (e.g. boats), competitive data collections and many other factors that will be apparent to those knowledgeable in the art. Data updates may be initiated on an as-needed basis or periodically on a pre-set schedule. Criteria may be established to automatically identify situations where data updates should be considered. Such criteria may include, for example and without limitation: usage of the data by subscribers, the quality of the data as may be determined by users and/or independent assessors, independent marketing assessment(s) of geographic areas of interest to E&P companies, the status of current drilling and production activity, the age of the data, the data type, the technology underlying the data and relevant improvements or changes to data collection technology and the logistics and/or costs of collecting new data.

Subsequent to the distribution of any suggested updates, information is collected from customers relating to their requests and suggestions for data updates (step 134). Alternatively, the step of providing suggested data updates may be omitted and suggested updates may be collected directly from the subscribers.

It will be appreciated that enabling the data users, i.e. the subscribers, to provide input and requests relating to data updates, represents a significant feature of the present invention. Such a methodology provides significant advantages to overcome or diminish many of the problems and challenges discussed in the Background of the Invention. More particularly, providing subscribers with a significant voice in updating data helps to ensure that E&P companies can, at the very outset of the data collection process, identify and request data that will be most effective for their business. Demand aggregation amongst subscribers provides the further advantages of reducing the complexity and number of transactions associated with assembling a shoot, reducing the costs associated with assembling a shoot, reducing the marketing efforts and risks traditionally undertaken by data collectors and other advantages that will now be apparent to those knowledgeable in the industry. These advantages will significantly improve the efficiency of the business model associated with the collection of the data.

As was discussed with respect to the customer subscription process 90 (FIG. 6) above, different types of subscriptions afford the subscribers different levels of rights with respect to the weighing of their input. Typically, more expensive subscriptions will result in greater rights to determine data updates. However, other factors such as length of subscription/membership, contribution of owned data, number of seats subscribed, geographic regions subscribed and the like can be considered in determining subscriber rights in this area. In one embodiment of the invention, subscribers are accorded votes in a quantity related to their subscription parameters. That quantity may be determined, for example, by the cost of a subscription to a subscriber, the duration of a subscription and/or the number of user seats purchased by a subscriber. In another embodiment, voting rights are limited to the specific geographic region of a particular subscriber's subscription. These votes are cast by the subscribers and collected and evaluated by the system operator.

In another embodiment of the invention, subscribers are afforded positions on a committee in accordance with their voting rights. Subscribers having greater voting rights may, for example, obtain more committee positions or committee management positions or both. Input relating to data updates is collected from the subscribers through the committee. Votes and requests are considered as a whole. Votes may be prioritized according to count and votes for similar or overlapping shoots may be intelligently considered as a whole.

Subsequent to the collection of input from subscribers, the system operator evaluates the cost and viability of updating the data in accordance with the priorities voiced by the subscribers (step 138), makes a final decision as to data updates including relevant parameters such as geographical area, data type, scheduling and the like (step 140) and eventually proceeds with the actual data update process (step 142). The evaluation process may optionally include actually negotiating with data collectors in order to determine the cost and availability of data collection resources. It will be understood that such updates can take months or even years to complete if new data is collected through a marine- or land-based seismic data collection process. Data relating to such data updates is stored in data update database 50 in the manner described above. The newly collected seismic data is of course stored in geophysical database 32, for accessing by subscribers in accordance with FIG. 7.

It will be appreciated that the data update process described with respect to FIG. 8 may be executed over a network, for example a private data network or a public data network such as the Internet.

Figure 9:
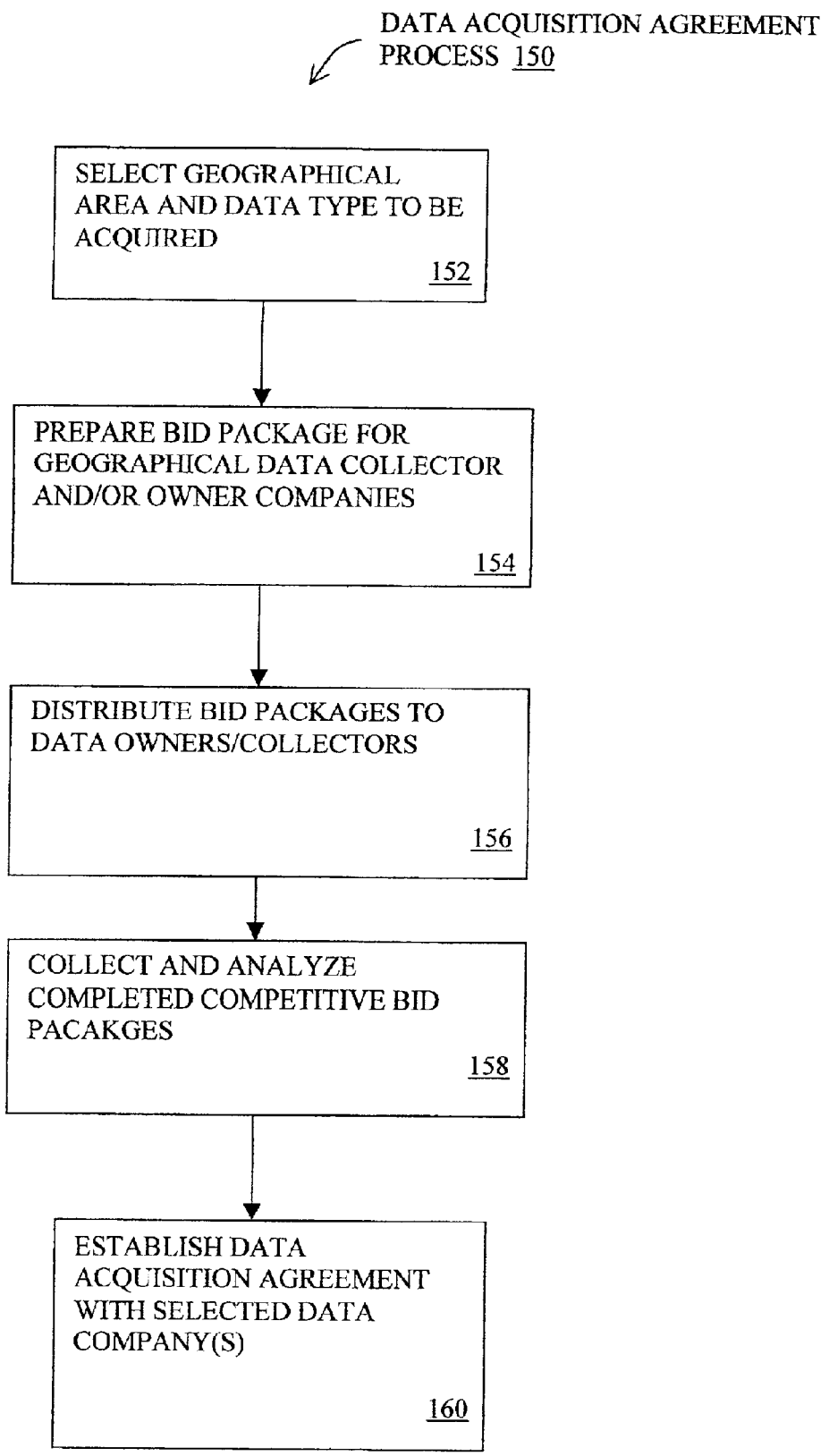
FIG. 9 is a flow chart illustrating a method of placing a data acquisition agreement with a data acquisition company in accordance with the present invention.

With reference now to FIG. 9, there is shown a process 150 for establishing agreements to acquire geophysical data in accordance with one embodiment of the present invention.

In the past, data acquisition, whether done by actual collection of marine or land data as described above, or by purchase or license from existing data owners, was generally performed via an inter-party negotiation. That is, the party or parties desiring to obtain the data negotiated an agreement directly with the data owner or collector.

In accordance with the present invention, data acquisition is done in a more cost-effective competitive bid process between the system operator and data providers as will now be described.

As a result of data update process 130 (FIG. 8) described above, the system operator has selected the geography and data type to be acquired (step 152). Subsequently a bid package is prepared by the system operator (step 154) and distributed to various identified owners and/or collectors of the desired data (step 156). Completed competitive bid packages are collected and evaluated (step 158) and an appropriate data acquisition agreement is negotiated with the most competitive bidder (step 160).

It will be appreciated that, in contrast to the prior art, this data update is obtained as a result of a group of subscribers, typically E&P companies, working together through their subscriptions to aggregate demand—that is to identify, select and pay for updates as a group. In contrast to the established processes described in the Background, above, aggregation of demand provides the significant advantages described herein above.

There has thus been provided new and improved methods and systems for collecting, managing, distributing and updating geophysical data. The invention uses the power of aggregate demand, through the formation of a subscription-based multi-party entity, to select, purchase and share seismic data. The invention substantially lowers E&P user costs while providing access to increased data. Aggregated demand further serves to reduce many of the costs, risks and uncertainties faced by data collectors, particularly boat operators, under the old methodologies.

The invention has particular application in the energy industry and more particularly to companies that collect, distribute, use or are otherwise involved with geophysical data.

While described with respect to particular embodiments, the invention is not thus limited. Numerous modifications, changes, updates, improvements and the like, all within the scope of the invention, will now become apparent to the reader.

What is claimed is:

1. A method operable on a computer for establishing a seismic survey database containing data relating to underground structures, comprising the steps of:
   storing said data in said seismic survey database coupled to said computer, said data including multiple shoots;
   establishing a plurality of accounts, each respective account for a user including access to subscriber data in said seismic survey database and a right to provide input on updates to said seismic survey database;
   collecting from the users input relating to updating said seismic survey database;
   identifying, based in at least part on said collecting step, using said computer, a new shoot to add to said seismic survey database;
   identifying a plurality of potential data providers to provide said new shoot;
   providing to said plurality of potential data providers information about said new shoot;
   soliciting, from each of said plurality of potential data providers, a bid for said new shoot;
   collecting the bid from each of said plurality of potential data providers to provide said new shoot;
   selecting, using the bids, a selected provider for said new shoot; and
   acquiring said new shoot from said selected provider.

2. The method of claim 1 wherein said selected provider is a data owner and said step of acquiring includes acquiring existing data from said selected provider.

3. The method of claim 1 wherein said selected provider is a data collector and said step of acquiring includes the steps of:
   waiting while said selected provider collects said new shoot; and
   acquiring the newly collected said new shoot from said selected provider.

4. The method of claim 1 wherein said step of acquiring includes acquiring said new shoot by at least one of the group comprising purchasing said new shoot and licensing said new shoot.

5. The method of claim 1 wherein said new shoot comprises an update of at least a portion of a shoot residing in said seismic survey database.

6. The method of claim 1 wherein said new shoot comprises a collection of data at least a portion of which is not residing in said seismic survey database.

7. The method of claim 1 wherein said right to provide input includes a right to submit a vote.

8. The method of claim 1 wherein said right to provide input includes participating on a committee that provides input on updates to said seismic survey database.

9. A system for operating a seismic survey database containing data relating to underground structures, comprising:
   a controller;
   a memory connected to said controller, said memory storing instructions operative with said controller to perform the steps of:
   storing said data in said seismic survey database, said data including multiple shoots;
   establishing a plurality of accounts, each respective account for a user including access to subscriber data in said seismic survey database and a right to provide input on updates to said seismic survey database;
   collecting from the users input relating to updating said seismic survey database;
   identifying, based in at least part on said collecting step, a new shoot to add to said seismic survey database;
   identifying a plurality of potential data providers to provide said new shoot;
   providing to said plurality of potential data providers information about said new shoot;
   transmitting, to each of said plurality of potential data providers, a request for a bid for said new shoot;
   collecting the bid from each of said plurality of potential data providers to provide said new shoot;
   selecting, using the bids, a selected provider for said new shoot; and
   acquiring said new shoot from said selected provider.

10. The system of claim 9 wherein said selected provider is a data owner and said step of acquiring includes acquiring existing data from said selected provider.

11. The system of claim 9 wherein said selected provider is a data collector and said step of acquiring includes the steps of:
   waiting while said selected provider collects said new shoot; and
   acquiring the newly collected said new shoot from said selected provider.

12. The system of claim 9 wherein said step of acquiring includes acquiring said new shoot by at least one of the group comprising purchasing said new shoot and licensing said new shoot.

13. The system of claim 9 wherein said new shoot comprises an update of at least a portion of a shoot residing in said seismic survey database.

14. The system of claim 9 wherein said new shoot comprises a collection of data at least a portion of which is not residing in said seismic survey database.

15. The system of claim 9 wherein said right to provide input includes a right to submit a vote.

16. The system of claim 9 wherein said light to provide input includes participating on a committee that provides input on updates to said seismic survey database.

17. A system for operating a seismic survey database containing data relating to underground structures, comprising:
   means for storing said data in said seismic survey database, said data including multiple shoots;
   means for establishing a plurality of accounts, each respective account for a user including access to subscriber data in said seismic survey database and a right to provide input on updates to said seismic survey database;
   means for collecting from the users input relating to updating said seismic survey database;
   means for identifying, based in at least part on said collecting step, a new shoot to add to said seismic survey database;
   means for identifying a plurality of potential data providers to provide said new shoot;
   means for providing to said plurality of potential data providers information about said new shoot;
   means for soliciting, from each of said plurality of potential data providers, a bid for said new shoot;
   means for collecting the bid from each of said plurality of potential data providers to provide said new shoot;
   means for selecting, using the bids, a selected provider for said new shoot; and
   means for acquiring said new shoot from said selected provider.

18. The system of claim 17 wherein said selected provider is a data owner and said means for acquiring includes means for acquiring existing data from said selected provider.

19. The system of claim 17 wherein said selected provider is a data collector and said means for acquiring includes:
   means for waiting while said selected provider collects said new shoot; and
   means for acquiring the newly collected said new shoot from said selected provider.

20. The system of claim 17 wherein said means for acquiring includes means for acquiring said new shoot by at least one of the group comprising purchasing said new shoot and licensing said new shoot.

21. The system of claim 17 wherein said new shoot comprises an update of at least a portion of a shoot residing in said seismic survey database.

22. The system of claim 17 wherein said new shoot comprises a collection of data at least a portion of which is not residing in said seismic survey database.

23. The system of claim 17 wherein said right to provide input includes a right to submit a vote.

24. The system of claim 17 wherein said right to provide input includes participating on a committee that provides input on updates to said seismic survey database.

25. A computer program product, for use with a computer system, for operating a seismic survey database containing data relating to underground structures, the computer program product comprising:
   a computer-readable medium containing thereon instructions operative to control the operation of the computer system to perform the steps of:
   storing said data in said seismic survey database, said data including multiple shoots;
   establishing a plurality of accounts, each respective account for a user including access to subscriber data in said seismic survey database and a right to provide input on updates to said seismic survey database;
   collecting from the users input relating to updating said seismic survey database;
   identifying, based in at least part on said collecting step, a new shoot to add to said seismic survey database;
   identifying a plurality of potential data providers to provide said new shoot;
   providing to said plurality of potential data providers information about said new shoot;
   soliciting, from each of said plurality of potential data providers, a bid for said new shoot;
   collecting the bid from each of said plurality of potential data providers to provide said new shoot;
   selecting, using the bids, a selected provider for said new shoot; and
   acquiring said new shoot from said selected provider.

26. The computer program product of claim 25 wherein said selected provider is a data owner and said step of acquiring includes acquiring existing data from said selected provider.

27. The computer program product of claim 25 wherein said selected provider is a data collector and said step of acquiring includes the steps of:
   waiting while said selected provider collects said new shoot; and
   acquiring the newly collected said new shoot from said selected provider.

28. The computer program product of claim 25 wherein said step of acquiring includes acquiring said new shoot by at least one of the group comprising purchasing said new shoot and licensing said new shoot.

29. The computer program product of claim 25 wherein said new shoot comprises an update of at least a portion of a shoot residing in said seismic survey database.

30. The computer program product of claim 25 wherein said new shoot comprises a collection of data at least a portion of which is not residing in said seismic survey database.

31. The computer program product of claim 25 wherein said right to provide input includes a right to submit a vote.

32. The computer program product of claim 25 wherein said right to provide input includes participating on a committee that provides input on updates to said seismic survey database.

* * * * *

UNITED STATES PATENT AND TRADEMARK OFFICE
CERTIFICATE OF CORRECTION

PATENT NO. : 6,931,378 B2
DATED : August 16, 2005
INVENTOR(S) : Rao et al.

It is certified that error appears in the above-identified patent and that said Letters Patent is hereby corrected as shown below:

Drawings,
Sheet 2 of 9, Fig. 2, Block 34C, delete "CONSIDITONS" and insert
-- CONDITIONS --, therefor.

Column 4,
Line 13, delete "aud" and insert -- and --, therefor.

Column 17,
Line 9, delete "light" and insert -- right --, therefor.

Signed and Sealed this

Sixth Day of December, 2005

JON W. DUDAS
*Director of the United States Patent and Trademark Office*